June 17, 1930.  J. R. JOHNSON  1,763,708
UNIVERSAL MILLING MACHINE
Filed Nov. 8, 1921  5 Sheets-Sheet 3
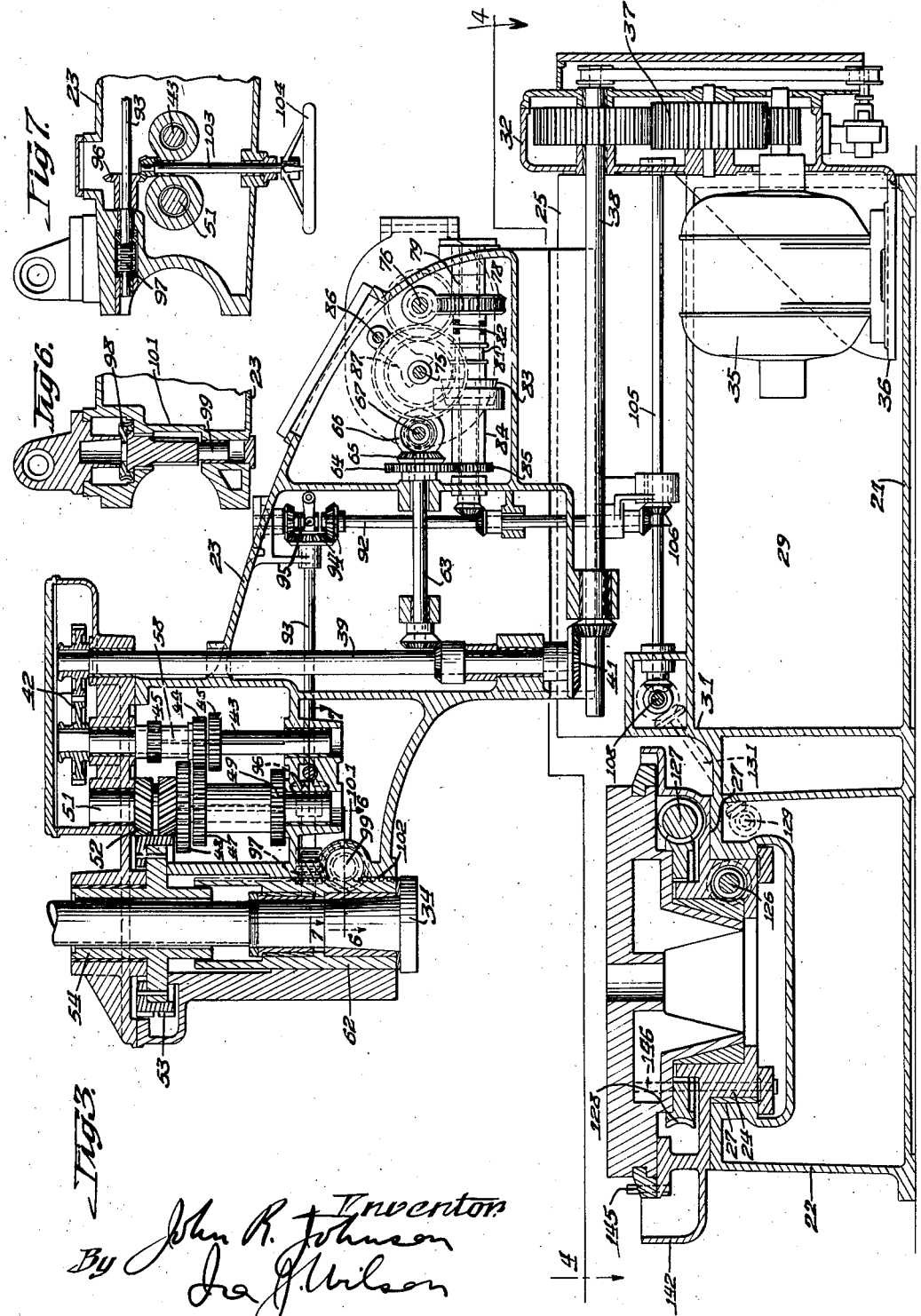

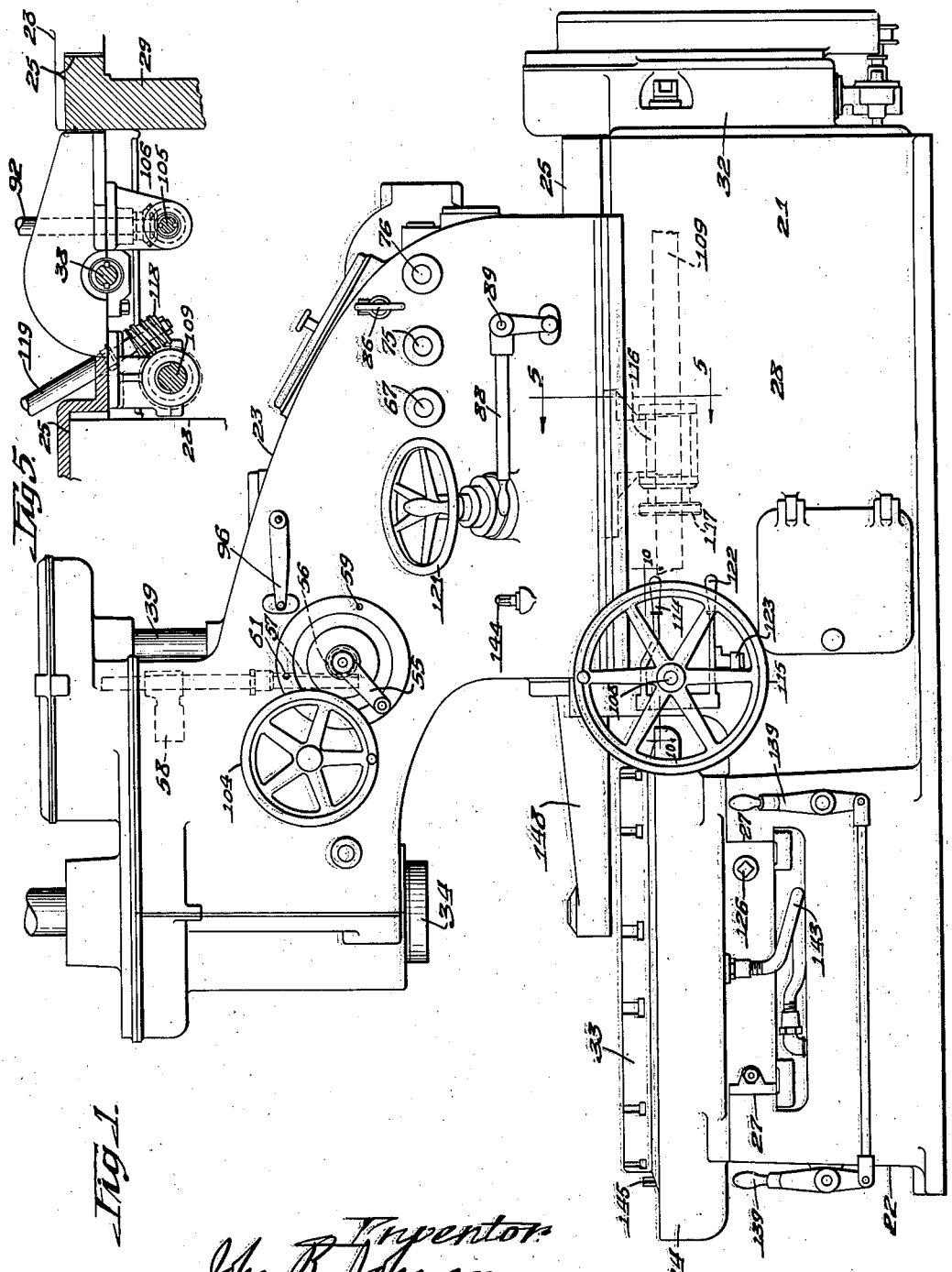

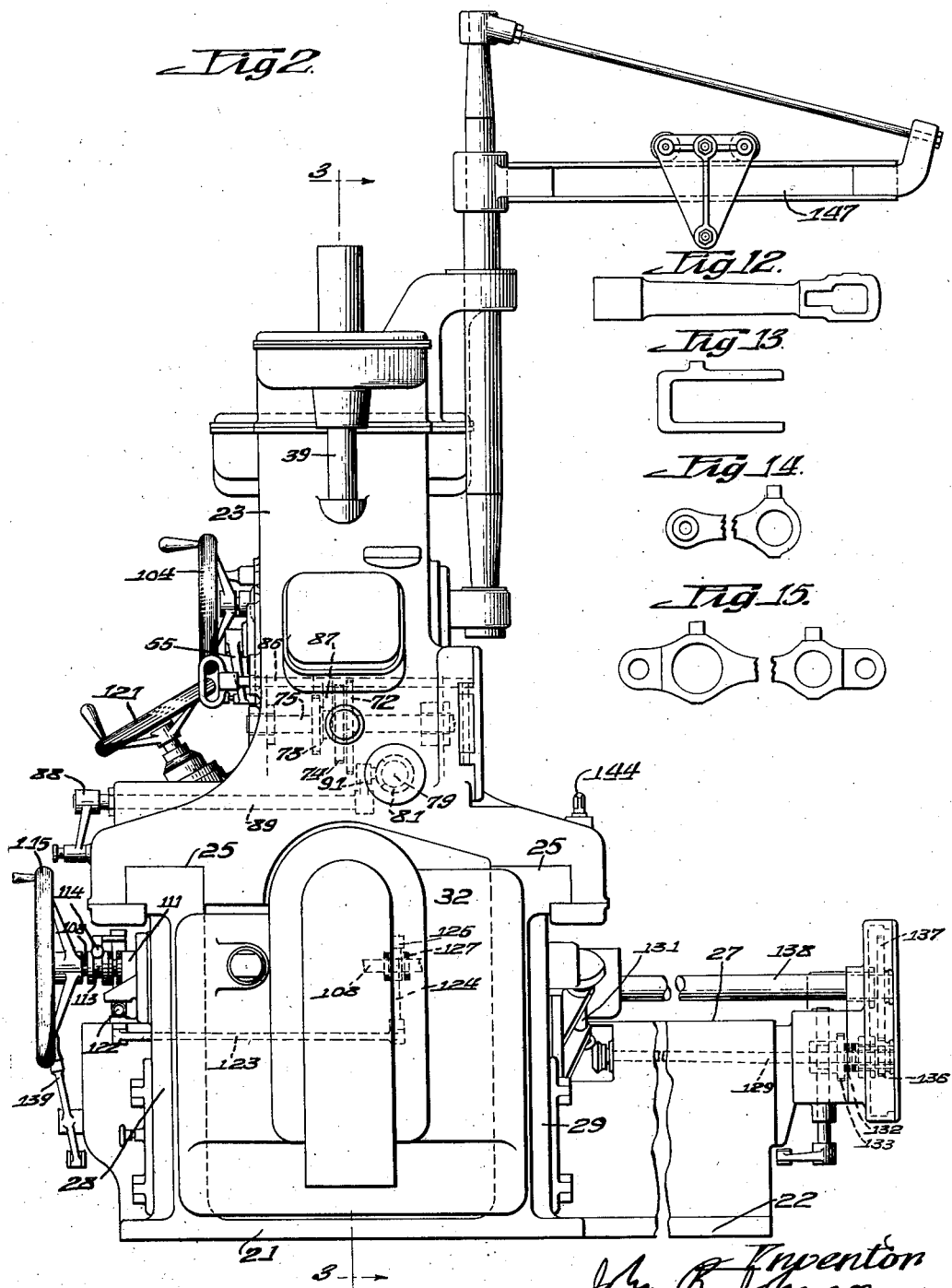

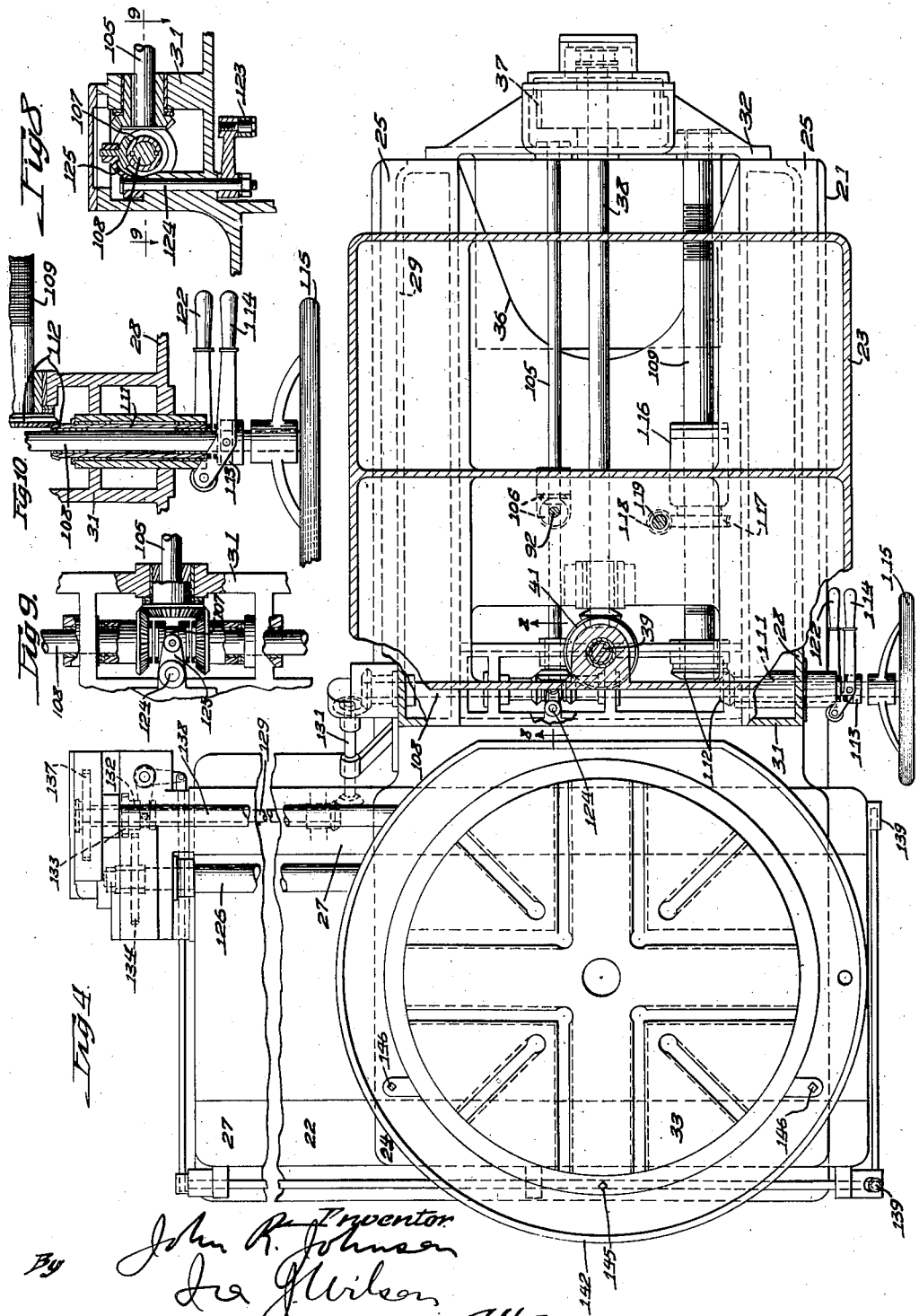

June 17, 1930.　　　J. R. JOHNSON　　　1,763,708
UNIVERSAL MILLING MACHINE
Filed Nov. 8, 1921　　　5 Sheets-Sheet 5

Patented June 17, 1930

1,763,708

UNITED STATES PATENT OFFICE

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS

UNIVERSAL MILLING MACHINE

Application filed November 8, 1921. Serial No. 513,842.

This invention relating in general to milling machines, has more particular reference to what might be termed a heavy duty universal milling machine.

I have aimed, primarily, to provide a milling machine having an unusually wide range of uses, and especially designed for heavy duty work. It follows that to this end extreme rigidity between the work and cutter in all working relations is essential; also that convenience of control of the large number of feeds and speeds is inimical to practicability of a machine of this character. These features are, therefore, important factors of the present invention.

In furtherance of the foregoing my invention contemplates the provision of a milling machine of novel design embodying comparatively few parts considering the functions and capacity of the machine, and arrangement of such parts in such co-operative relation as to promote efficiency and economy in the construction and operation. In this regard, however, it will be understood that my invention is not limited to the particular construction herein shown for purpose of illustration.

My invention in its present embodiment comprises a milling machine characterized by a longitudinal feed spindle slide housing and a lateral feed table saddle mounted on an L-shaped bed and equipped respectively with a vertical feed cutter spindle and a rotary work table, and mechanism exceptionally simple in its design for transmitting rapid traverse and feed movements to the cutter spindle, the spindle slide housing, the table saddle, and the rotary table. There is also provided means whereby feed movements may be transmitted to these parts by hand, the complete organization being such as to be within convenient control of the operator at all times.

With reference to its universal use, the following are some examples: As a vertical universal machine with extreme range of longitudinal feed, making it particularly desirable for narrow long work, in railroad ordnance, drop forge and engine works; as a universal milling machine for large factory work requiring the drilling and boring of holes and milling straight and curved surfaces in different planes; as a traverse head shaping machine, it will do any work that a shaper will do and has a greater range by reason of the fact that it can mill three surfaces at one setting; as a cylinder boring machine for large cylinders; as a die sinking machine; as a vertical cold saw cutting machine for cutting off large rings or large round billets, and for this purpose it will prove more efficient than any prior machine of which I am aware; as a tire and wheel boring and turning mill for division repair shops; as a radius milling machine for milling steam turbine bucket segments, locomotive connecting rods and straps, radius links for marine engines, cams and spirals; and for other uses within its capacities.

Other objects and attendant advantages will be appreciated by those skilled in this art as the invention becomes better understood by reference to the following description when considered in connection with the accompanying drawings wherein:

Figure 1 is a side elevation showing the control side of a universal milling machine embodying my invention;

Fig. 2 is a rear elevation of the machine;

Fig. 3 is a vertical longitudinal section through the machine taken substantially on the line 3—3 of Fig. 2;

Fig. 4 is a horizontal sectional view taken substantially on the line 4—4 of Fig. 3;

Fig. 5 is a fragmentary vertical sectional view taken on the line 5—5 of Fig. 1;

Figure 11:
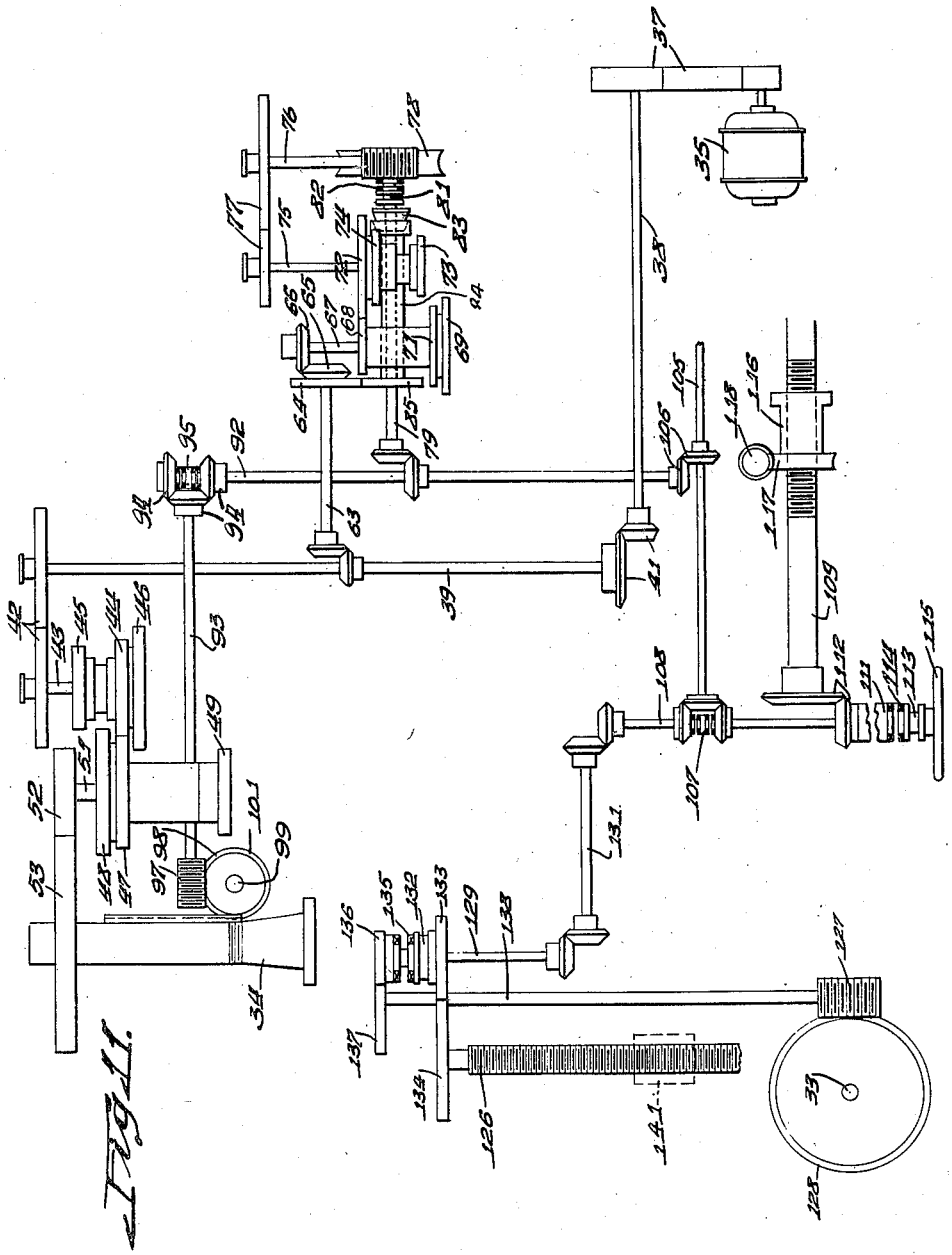

Figs. 6 and 7 are fragmentary horizontal sections taken substantially on the lines 6—6 and 7—7 of Fig. 3;

Fig. 8 is a detail vertical section taken on the line 8—8 of Fig. 4;

Figs. 9 and 10 are fragmentary horizontal sections taken substantially on the lines 9—9 and 10—10 of Figs. 8 and 1, respectively;

Fig. 11 is a diagrammatic chart showing the gearing and driving trains; and

Figs. 12 to 15 inclusive are examples of contour milling done on this machine.

In the present embodiment of this invention, the bed is in the form of a heavy onepiece casting shaped to provide a longitudinal wing 21 and a lateral wing 22 adapted for carrying a spindle slide 23 and a table saddle 24 respectively, these numerals being generally applied. As shown in Fig. 4, the wings 21 and 22 form an L-shaped bed, the former having longitudinal or forwardly and rearwardly extending ways 25, upon which the spindle slide or housing 23 is mounted and the latter having laterally extending ways 27 on which the table saddle 24 is mounted to travel laterally with respect to the spindle slide. Viewing Fig. 2, it will be observed that the ways 25 are formed on the upper ends of the front and rear walls 28 and 29 constituting part of the bed wing portion 21 and that these walls are united at their forward ends by the transverse wall structure 31 and at their rear ends by a rear plate structure 32 which also forms a housing and mounting for a motor and driving gears. The table saddle 24 carries a rotary work table 33, and the spindle slide housing 23 is shaped to overhang the work table and to carry thereabove a vertical cutter spindle 34, all of which will be presently more fully described.

My invention contemplates among other things, the provision of power and hand operated mechanism for imparting various movements to the cutter spindle, the spindle slide, the rotary table and the table saddle, which will be considered in order.

Power may be derived from any suitable source, and in the present instance I employ an electric motor 35 mounted on a pad 36 integral with the rear plate 32 and disposed within the bed. The motor constitutes with the driven gears 37 mounted on the rear plate 32, a unit of assembly. The upper gear 37 is fixed to a drive shaft 38 which is held against longitudinal translation on the bed and is in constant driving connection with a vertical shaft 39 through the agency of bevel gears 41, the lower gear 41 being splined on the shaft 38 and so associated with the spindle slide as to move with the latter. Between the shafts 39 and the spindle 34, I have provided in a compact and well balanced manner, change-speed gearing for driving the spindle at different speeds. This comprises interchangeable gears 42 between the shaft 39 and a fixed intermediate shaft 43, a cluster of spur gears 44, 45 and 46 splined on the shaft 43 and adapted to mesh respectively with gears 47, 48 and 49, fixed to the second intermediate shaft 51. The latter shaft carries a fixed herringbone pinion 52 meshing with a herringbone gear 53 fixed to the driving sleeve 54 in which the cutter spindle is splined. The gear cluster may be shifted by any suitable means, such for example, as a hand lever 55 at the control side of the machine. This lever is fixed to a rock shaft carrying a pinion 56 in mesh with a vertical rack 57 which carries a fork 58 engaging the gear cluster. As shown in Figs. 1 and 3, the lever 55 is in position for the intermediate speed and upon movement of said lever in a counter-clockwise direction to the position defined by the detent socket 59, the slow speed gear 45 will mesh with the gear 48, and upon continued movement of the lever to the position defined by the detent socket 61 the high speed gear 46 will mesh with the gear 49, thereby giving three changes in speed. A greater range is obtained by interchanging the gears 42.

Both power and hand-operated mechanism is provided for feeding the quill 62 vertically. This comprises, generally stated, a rapid traverse and feed mechanism including change-speed gearing for obtaining various feed speeds, said mechanism being mounted in the spindle slide housing, preferably at the rear end thereof, and driven from the vertical shaft 39. This mechanism as will be presently described is also employed for imparting similar movements to the spindle slide, the table saddle and the rotary table. Referring now more particularly to Fig. 3 and the chart shown in Fig. 11, it will be seen that the vertical driving shaft 39 is in constant driving connection with a horizontal shaft 63 which carries a fixed spur gear 64 and a bevel gear 65. The latter gear meshes with a bevel gear 66 fixed to a shaft 67, which carries a cluster of fixed gears 68, 69 and 71. A cluster of gears 72, 73 and 74 splined on the shaft 75 is adapted to mesh respectively with the gears 68, 69 and 71 to effect changes in speed. The shaft 75 drives a worm shaft 76 through the agency of interchangeable spur gears 77, and the worm on said shaft meshes with a worm gear 78, loose on a shaft 79. A clutch element 81 splined on the shaft 79 is equipped at one end with clutch teeth 82 adapted to engage complemental teeth on the worm gear and to be shifted in the opposite direction to engage its cone face 83 with the complemental face on a sleeve 84 which is loose on the shaft 79 and carries a gear 85 meshing with the gear 64. It will be manifest from the foregoing that the parts 78 and 84 will be constantly driven, the former at a slow speed, and the latter fast, and that by shifting the clutch element 81 either of said parts may be connected to the shaft 79 for the purpose of establishing either the feed or rapid traverse speed, the latter being in the reverse direction from the feed, so that when the cone clutch is engaged, a quick return movement will be transmitted. The feed may be varied by shifting the cluster gears 72, 73 and 74 as will be obvious. To this end, a hand slide rod 86 is provided, equipped with a fork 87 for shifting the cluster gears in the usual manner. The clutch element 81 may be shifted by means of a hand lever 88 fixed to a rod 89 and having an upstanding forked arm 91 engaging said element. By swinging the lever 88 upwardly, viewing Fig. 1, the feed clutch will be engaged, and downward movement will engage the rapid reverse clutch. The driven shaft 79 of the change speed mechanism just described, which drives a vertical shaft 92, is adapted for driving a horizontal shaft 93 through the agency of bevel gears 94 and a reversing clutch 95. The clutch 95 may be engaged by operation of the hand lever 96 at the control side of the machine, as will be obvious. As shown in Fig. 7, there is fixed to the shaft 93 a bevel gear 96 and a worm 97, the latter meshing with a worm gear 98, Fig. 6, fixed to a pinion shaft 99. The pinion 101 meshes with rack teeth 102 on the quill 62. The bevel gear 96 meshes with a bevel gear fixed to a shaft 103 adapted to be rotated by hand as by means of the hand wheel 104 at the control side of the machine. By means of the foregoing mechanism, the quill and spindle may be fed vertically by hand operation of the wheel 104, and assuming the clutch 95 to be enegaged in either position the spindle may be fed vertically accordingly by power upon operation of the hand lever 88 to engage either the feed or rapid reverse clutch. It will thus be seen that both manual and power spindle feed are provided, giving a considerable range of feeds and a quick reverse.

The spindle slide housing may be fed forwardly and backwardly by power through the agency of the feed and rapid reverse mechanism described above, and the feed may be accelerated or diminished at will by manual operation without disturbing the power feed, thereby giving the operator greater freedom of control in guiding the tool, which is especially desirable in contour milling. To this end, the vertical shaft 92 drives a horizontal shaft 105 held on the bed against longitudinal translation, the drive being through the agency of bevel gears 106, the lower gear of which is splined on the shaft 105 and travels with the spindle slide. The shaft 105 drives through a reversing clutch 107, a horizontal shaft 108 journaled on the bed. This shaft 108 is adapted for rotating a screw 109 for moving the spindle slide back and forth. A suitable clutch is interposed in this connection, comprising a sleeve 111 loose on the shaft 108 and connected at one end by bevel gears 112 to the shaft 109 and at its opposite end equipped with clutch teeth adapted to be engaged by the clutch element 113 splined on the shaft 108. A suitable hand lever 114 is provided for shifting the clutch element 113. The shaft 108 may be revolved by hand as by means of a hand wheel 115. The screw 109 works in a nut 116 held against translation on the spindle slide as shown in Fig. 1, so that upon rotation of the screw in opposite directions the slide will be moved back and forth. There is fixed to the nut 116 a worm gear 117 with which meshes a worm 118, shown in Fig. 5, the worm being fixed to a shaft 119 reaching upwardly through the spindle slide housing and equipped at its upper end with a hand wheel 121. The foregoing provides a means whereby the spindle slide housing may be moved either forwardly or backwardly by power at any of several feed speeds or at the rapid traverse feed. Furthermore, the feed in either direction may be accelerated or diminished independently of the power feed by operation of the hand wheel 121. These movements are controlled as follows: Assuming the feed clutch 82 engaged and the clutch 107 engaged in either position, upon engaging the clutch 113 the spindle slide will be moved in one direction, say forwardly, at a speed determined by the position of the cluster gears 72 to 74 inclusive. During this forward feed the nut 116 is locked against rotation by its worm and gear, but the worm may be manually rotated by operation of the hand wheel 121 to either quicken or slacken the travel of the spindle slide along the screw 109. The advantage of this hand feed in addition to the power feed will be appreciated with reference to contour milling. Upon throwing the clutch 107 in the opposite direction, the feed will be reversed, thereby traveling the spindle slide backwardly at the same speed; or if a quick return is desired the clutch 107 will be undisturbed and the rapid reverse clutch 83 will be engaged. The means for throwing the clutch 107 consists in the present instance of a hand lever 122 at the control side of the machine connected by means of a link 123 to a rock shaft 124, Fig. 8, to which is attached an arm 125 operatively engaging the clutch element 107. It will be apparent also that the spindle slide may be traveled forwardly at any of the feed speeds and the rapid traverse speed, the feed changes being obtained by shifting the cluster gears, and the rapid traverse speed in the same direction being obtained by engaging the rapid traverse clutch and simultaneously throwing the reversing clutch 107. The reason for throwing the rapid traverse clutch and the reversing clutch simultaneously to change the speed in the same direction is that when the rapid traverse clutch is engaged it reverses the direction of drive from said clutch on to the screw shaft 109 as explained above, and in order to restore the forward speed the reversing clutch 107 is thrown to its opposite position, thereby reversing the drive from said reversing clutch on to the screw shaft 109 and producing rapid traverse speed forward.

Coming now to the rotary table and table saddle feeds, it will be noted that these are practically the same as for the spindle slide, except as modified by interposed gearing to obtain different feed ratios. Both the rotary table and the table saddle will, however, be propelled by the same power operated mechanism as propels the spindle slide. That is, as shown in Figs. 4 and 11, the shaft 108 which drives the spindle slide screw, likewise drives the table saddle screw 126 and the worm 127, which meshes with the worm gear 128 on the rotary table. More particularly, the shaft 108 drives a shaft 129 on the lateral wing bed portion 122 through the agency of an intermediate shaft 131 and bevel gears. A shiftable clutch element 132 slidable on the shaft 129 carries a spur gear 133, adapted to be brought into and out of mesh with a spur gear 134 fixed to the table saddle screw 126, and also has clutch teeth 135 adapted to engage complemental teeth on a spur gear 136 loose on the shaft 129 and in mesh with a gear 137 fixed to the worm shaft 138. The clutch element 132 is adapted to be shifted by means of either hand lever 139 at the control side of the machine operating through suitable connecting rods as shown. Feed or rapid traverse movement may be imparted independently to either the work table or the saddle according to the position of the clutch element 132, the reversing clutch 107 and the clutch element 81. Either the table or saddle may be moved by manual operation of the hand wheel 115, and likewise the saddle may be moved laterally by direct rotation of the feed screw 126 by means of the usual hand crank. It will be observed that the screw 126 is held against longitudinal translation and has the usual screw engagement as at 141, with the saddle. As shown in Fig. 4, the saddle has an annular chip and drain pan 142 with a flexible hose connection 143 leading to a drain reservoir in the bed. The top of the rotary table, suitably slotted for the mounting of fixtures and work-pieces of various descriptions, has both cone and flat bearings of substantial area on the saddle. As shown in Fig. 3, the table and its saddle are mounted so as to be exceedingly rigid under the heavy strains of heavy duty work.

In operation, either the spindle slide, the rotary table or the table saddle may be rigidly locked on its respective supporting base by tightening the clamp bolts 144, 145 and 146, as the case may require. The spindle quill may also be clamped in the slide head by the usual clamping bolts. Inasmuch as the machine is especially adapted for heavy work, a suitable crane, designated generally by character 147, Fig. 2, is provided permitting convenient loading of the fixture and work on the table 33 when the latter is positioned on the outer end of the lateral wing. In some instances, an arbor support 148, Fig. 1, may be required for the lower end of a cutter arbor carried by the spindle. Other well known attachments may be likewise used such for example as a radius link when milling on a large radius, and a universal small spindle attachment. The operator standing at the control side of the machine has all of the feed and speed movements under immediate control, so that any may be quickly and independently effected. As explained above, various spindle speeds and feeds are availabl for boring purposes and also to suit the conditions and requirements of various jobs. Furthermore, in one setting of work on the table a hole may be bored and the work may be contour milled concentric with said hole. When used as a shaper, the work table will be locked and the spindle slide may be fed back and forth and is capable of milling the top and two sides of a work-piece in one setting. Milling operations may be performed in planes at right angles by reason of the longitudinal and lateral feed, or at any intermediate angle by reason of the rotary adjustment of the work table to align the faces to be milled with either the longitudinal or lateral cutting planes. Contour and radius milling may be effected by the proper relative movement of the work table and cutter. An example of contour and radius milling is shown in Fig. 12, of a locomotive main rod in the form of a steel forging. It will be observed that the entire contour of this part may be milled, although one or more smaller cutters are employed for the interior cut, the radius of the cutters being determined by the minimum radius at the inner corners. Fig. 13 shows a main rod strap which may be milled inside and outside; and Figs. 14 and 15 show locomotive side rods which may be milled to the requisite shape. It will be understood that these work-pieces are relatively large steel forgings and that heavy cuts are required to produce the desired shapes. The machine is adapted for a wide range of milling operations, especially where there is a large amount of stock to be removed.

It is believed that the foregoing conveys a clear understanding of the objects prefaced above, and while I have illustrated but a single working embodiment, it should be understood that considerable change might be made in the design, construction and arrangement without departing from the spirit and scope of the invention as expressed in the appended claims, in which—

I claim:

1. A milling machine comprising a bed, a spindle slide housing mounted on horizontal ways on the bed to move forwardly and backwardly, a cutter spindle on said slide on a vertical axis, a table saddle mounted on the bed to move laterally with respect to the spindle slide, a rotary work table mounted on said saddle to revolve about a vertical axis on ways substantially co-planar with said horizontal spindle housing ways, and mechanism on the spindle slide for driving the spindle having an extension between the slide and the bed and between the bed and the saddle to transmit lateral feed to the saddle.

2. A milling machine comprising a bed, a spindle slide housing mounted on horizontal ways on the bed to move forwardly and backwardly, a cutter spindle on said slide on a vertical axis, a table saddle mounted on the bed to move laterally with respect to the spindle slide, a rotary work table mounted on said saddle to revolve about a vertical axis on ways substantially co-planar with said horizontal spindle housing ways, and mechanism carried by the spindle slide for transmitting lateral feed to said saddle and rotary feed to said table.

3. A milling machine comprising a bed, a spindle slide housing mounted on horizontal ways on the bed to move forwardly and backwardly, a cutter spindle on said slide, a table saddle mounted on the bed to move laterally with respect to the spindle slide, a rotary work table mounted on said saddle to revolve about a vertical axis on ways substantially co-planar with said horizontal spindle housing ways, and mechanism carried by the spindle slide for transmitting rapid traverse and feed movements to said saddle and rotary table.

4. A milling machine comprising a bed, a spindle slide housing mounted on horizontal ways on the bed to move forwardly and backwardly, a cutter spindle on said slide, a table saddle mounted on the bed to move laterally with respect to the spindle slide, a rotary work table mounted on said saddle to revolve about a vertical axis on ways substantially co-planar with said horizontal spindle housing ways, and mechanism carried by the spindle slide and transmitting through a single shaft rapid traverse and feed movements to said spindle slide, table saddle and rotary table.

5. A milling machine comprising a bed, a spindle slide housing mounted on horizontal ways on the bed to move forwardly and backwardly, a cutter spindle on said slide, a table saddle mounted on the bed to move laterally with respect to the spindle slide, a rotary work table mounted on said saddle to revolve about a vertical axis on ways substantially co-planar with said horizontal spindle housing ways, a motor on the bed, feed mechanism carried by the spindle slide, means for driving said mechanism from said motor, and means for transmitting feed from said mechanism to the spindle, spindle slide, table saddle and rotary table.

6. A milling machine comprising a bed, a work table and a spindle slide mounted on the bed, a cutter spindle carried by the spindle slide, a screw for feeding the slide toward and from the work table, variable speed gearing for operating said feed screw, a rotatable nut operating between the feed screw and spindle slide, and manually operable means for rotating said nut during and independently of operation of said feed screw.

7. In a milling machine of the character described, the combination of a horizontal feed spindle slide, a cutter spindle on said slide, a lateral feed table saddle, a rotary table on said saddle, a vertical driving shaft, change-speed gearing interposed between said driving shaft and the spindle for driving the latter at different speeds, rapid traverse and change-speed gearing driven by said vertical shaft, and driving trains between the latter gearing and the cutter spindle, the spindle slide, the rotary table and the table saddle, whereby to transmit rapid traverse and variable feed movements to said parts.

8. In a milling machine of the character described, the combination of a lateral feed table saddle, a rotary table on said saddle, a longitudinal feed spindle slide, a cutter spindle on said slide above said table, a common variable speed power-operated feed mechanism for imparting feeds to the cutter spindle, spindle slide, rotary table and table saddle, means for independently connecting said parts to said mechanism, and manually operable means for imparting feed movement to each of said parts either independent of or simultaneously with said power-operated mechanism.

9. In a milling machine of the character described, the combination of a rotary work table, a lateral feed table saddle, a longitudinal feed spindle slide carrying a cutter spindle, a driving shaft below the spindle slide, a vertical shaft carried by the spindle slide and constantly in mesh with said driving shaft, change-speed gearing between said vertical shaft and the cutter spindle for driving the latter, a screw for feeding the spindle slide longitudinally, a screw for feeding the table saddle laterally, a worm gear for revolving the rotary table, change-speed gearing carried by the spindle slide and driven by said vertical shaft, and means operated by the last mentioned change-speed gearing for driving said spindle slide screw, table saddle screw and table feed worm.

10. A milling machine of the character described comprising a bed, a spindle slide movable forwardly and backwardly on the bed, a work table on the bed movable back and forth transversely with respect to the movement of the slide, a vertical cutter spindle on the slide overhanging the work table, and a cutter arbor support fixed to the slide between the work table and spindle and arranged to move with the slide and its spindle relative to the table.

11. A milling machine of the character described comprising a bed, a longitudinal feed spindle slide, a lateral feed table saddle, a rotary table on said saddle, a vertical cutter spindle on said slide overhanging the table, and a cutter arbor support fixed to the slide between the table and spindle and arranged to move with the slide and its spindle relative to the table.

12. A milling machine comprising a bed, a spindle slide mounted on horizontal ways on the bed to move forwardly and backwardly, a cutter spindle on said slide, a rotary table in front of said slide arranged to revolve about a vertical axis on ways substantially coplanar with said horizontal ways, and a single feed and traverse mechanism for the spindle and the table, the feed and traverse for each being separately engageable.

13. A milling machine comprising a bed, a spindle slide mounted on horizontal ways on the bed to move forwardly and backwardly, a cutter spindle on said slide, a rotary table mounted in front of said slide and arranged to revolve about a vertical axis on ways substantially coplanar with said horizontal ways, and a single feed and traverse mechanism for the spindle and table separately engageable and separately reversible as regards the feeding or traversing of the spindle and table.

14. A milling machine comprising a bed, a spindle slide mounted on horizontal ways on the bed to move back and forth in one line of direction, a cutter spindle on said slide, a table mounted on the bed to move back and forth at right angles to the movement of said slide and in a plane parallel with its movement, and mechanism carried by the slide for driving the spindle and for moving the same axially, the said mechanism also having an extension to the table for transmitting movement thereto, the connections between the spindle and the mechanism and between the table and the mechanism being separately engageable.

15. A milling machine comprising a bed, a spindle slide mounted on horizontal ways on the bed to move back and forth in one line of direction, a cutter spindle on said slide, a table saddle mounted on the bed to move back and forth at right angles to the movement of said slide and in a plane parallel with its movement, a rotary work-table mounted on top of said saddle to revolve about a vertical axis on ways in a plane parallel with the movement of said slide and saddle, and mechanism carried by the slide for driving the spindle and for moving the same axially, the said mechanism also having an extension to the table saddle for transmitting movement thereto and for revolving the table on the saddle.

16. A milling machine comprising a bed, a spindle slide mounted on horizontal ways on the bed to move back and forth in one line of direction, a cutter spindle on said slide, a table saddle mounted on the bed to move back and forth at right angles to the movement of said slide and in a plane parallel with its movement, a rotary work-table mounted on top of said saddle to revolve about a vertical axis on ways in a plane parallel with the movement of said slide and saddle, and mechanism carried by the slide for driving the spindle and for moving the same axially, the said mechanism also having an extension to the table saddle for transmitting thereto and for revolving the table on the saddle, the operating connections with the mechanism being in each case separately engageable and permitting of operation in either direction.

17. A milling machine comprising a bed having a work-table thereon, a spindle slide housing movably mounted on said bed to move back and forth in one line of direction, a drive shaft journalled in the base, a cutter spindle on said slide, change gearing carried by the slide for operating the spindle at different speeds, feed and traverse gearing also carried by the slide for communicating feed and traverse movements to the spindle, and a sliding gearing connection between said slide and said shaft for said change gearing and feed and traverse gearing.

18. A milling machine comprising a bed having a work-table thereon, a spindle slide housing movably mounted on said bed to move back and forth in one line of direction, a drive shaft journalled in the base, a cutter spindle on said slide, a sliding gearing connection between said slide and said shaft for said spindle for driving the latter, and change-speed gearing carried by the spindle slide operating between said sliding connection and said spindle.

19. A milling machine comprising a bed having a work-table thereon, a spindle slide housing mounted on said bed for movement back and forth in one line of direction with respect to said table, a drive shaft journalled in said base, a cutter spindle on said slide, a sliding gearing connection between said slide and said shaft for said spindle, feed mechanism for said spindle, and change-speed gearing carried by said slide operating between said sliding connection and said feed mechanism for transmitting rapid traverse and feed movements to said spindle.

20. A milling machine comprising a bed having a work-table thereon, a spindle slide housing mounted on said bed for movement back and forth in one line of direction with respect to said table, a drive shaft journalled in said base, a cutter spindle on said slide, a sliding gearing connection between said slide and said shaft for said spindle, feed mechanism for said spindle, change-speed gearing carried by said slide operating between said sliding connection and said feed mechanism for transmitting rapid traverse and feed movements to said spindle, and another change-speed gearing carried by said slide operating between said sliding connection and said spindle whereby to drive the latter at different speeds.

21. A milling machine comprising a bed having a work-table thereon, a spindle slide housing mounted on the bed to move back and forth toward and away from said table, a cutter spindle on said slide, a drive shaft journalled in said base, a sliding gearing connection between said shaft and said slide for operating said spindle, a feed screw for said slide, and change-speed gearing carried by said slide for operating said screw on rapid traverse and feed movements of said slide.

22. A milling machine comprising a bed having a work-table thereon, a spindle slide housing mounted on the bed to move back and forth toward and away from said table, a cutter spindle on said slide, a drive shaft journalled in said base, a sliding gearing connection between said shaft and said slide for operating said spindle, a feed screw for said slide, change-speed gearing carried by said slide for operating said screw on rapid traverse and feed movements of said slide, and manually operable means operating independently of said change-speed gearing for rotating said screw, there being a clutch between said manually operable means and said feed screw to disconnect the same therefrom for power operation of said screw.

23. A milling machine comprising a bed having a work-table thereon, a spindle slide housing mounted on the bed to move back and forth toward and away from said table, a cutter spindle on said slide, a drive shaft journalled in said base, a sliding gearing connection between said shaft and said slide for operating said spindle, a feed screw for said slide, and change-speed gearing carried by said slide for operating said screw on rapid traverse and feed movements of said slide, said screw having a nut threading thereon for communicating movement to said slide, said nut being fixed against lengthwise movement but capable of rotation, and manually operable means for rotating said nut to vary the speed of movement of said slide.

24. A milling machine comprising a bed having a work-table thereon, a spindle slide housing mounted on said bed to move back and forth toward and away from said table, a cutter spindle on said slide, a drive shaft journalled in said base, a sliding gearing connection between said shaft and said slide for operating said spindle, feed mechanism for said slide operating between said slide and said bed, feed mechanism for said spindle in said slide, and gearing connections between said sliding connection and each of said feed mechanisms.

25. A milling machine comprising a bed having a work-table thereon, a spindle slide housing mounted on said bed to move back and forth toward and away from said table, a cutter spindle on said slide, a drive shaft journalled in said base, a sliding gearing connection between said shaft and said slide for operating said spindle, feed mechanism for said slide operating between said slide and said bed, feed mechanism for said spindle in said slide, gearing connections between said sliding connection and each of said feed mechanisms, and a single manually operable means arranged to have connection with either of said feed mechanisms for operating the same.

26. A milling machine comprising a bed having a work-table thereon, a spindle slide housing mounted on said bed to move back and forth toward and away from said table, a cutter spindle on said slide, a drive shaft journalled in said base, a sliding gearing connection between said shaft and said slide for operating said spindle, feed mechanism for said slide operating between said slide and said bed, feed mechanism for said spindle in said slide, feed mechanism for said worktable, and gearing connections between said sliding connection and each of said feed mechanisms.

27. A milling machine comprising a bed having a work-table thereon, a spindle slide housing mounted on said bed to move back and forth toward and away from said table, a cutter spindle on said slide, a drive shaft journalled in said base, a sliding gearing connection between said shaft and said slide for operating said spindle, feed mechanism for said slide operating between said slide and said bed, feed mechanism for said spindle in said slide, feed mechanism for said worktable, and change-speed gearing carried by said slide operating between said sliding connection and said feed mechanisms whereby to transmit rapid traverse and feed movements to the slide.

28. A milling machine comprising a bed having a work-table thereon, a spindle slide housing mounted on said bed to move back and forth toward and away from said table, a cutter spindle on said slide, a drive shaft journalled in said base, a sliding gearing connection between said shaft and said slide for operating said spindle, feed mechanism for said slide operating between said slide and said bed, feed mechanism for said spindle in said slide, gearing connections between said sliding connection and each of said feed mechanisms, and another change-speed gearing carried by said slide between said sliding connection and said spindle for driving the latter at different speeds.

29. A milling machine comprising a bed having a work-table thereon, a spindle slide housing movably mounted on said bed to move back and forth in one line of direction with respect to said table, a drive shaft journalled in the base, a cutter spindle on said slide, a sliding gearing connection between said slide and said shaft for driving said spindle, feed mechanisms for said spindle, slide and work-table, and change-speed gearing carried by said slide and operating off said sliding gearing connection for imparting rapid traverse and feed movements to each of said feed mechanisms.

30. A milling machine comprising a bed having a work-table thereon, a spindle slide housing movably mounted on said bed to move back and forth in one line of direction with respect to said table, a drive shaft journalled in the base, a cutter spindle on said slide, a sliding gearing connection between said slide and said shaft for driving said spindle, feed mechanisms for said spindle, slide and work-table, and change-speed gearing carried by said slide and operating off said sliding gearing connection for imparting rapid traverse and feed movements to each of said feed mechanisms, said change-speed gearing comprising a secondary shaft in said slide housing operated continuously at the same speed from the first mentioned drive shaft, a first clutch element driven from said shaft for imparting the rapid traverse movements to said feed mechanisms, a train of shiftable gears also driven from said secondary shaft, a second clutch element arranged to be driven at variable speeds through said gear train to impart feed movements to said feed mechanisms, and a driven clutch element having connection with said feed mechanisms arranged to be connected with either of the first or second mentioned clutch elements.

31. A milling machine comprising a bed having a work-table thereon, a spindle slide housing movably mounted on said bed to move back and forth in one line of direction with respect to said table, a drive shaft journalled in the base, a cutter spindle on said slide, a sliding gearing connection between said slide and said shaft for driving said spindle, feed mechanisms for said spindle, slide and work-table, and change-speed gearing carried by said slide for operating off said sliding gearing connection for imparting rapid traverse and feed movements to each of said feed mechanisms, the feed mechanism for said slide comprising a feed screw driven by said change-speed gearing in either direction at the rapid traverse and feed speeds and a nut threading on said feed screw held against endwise movement but capable of rotation, and manually operated means for rotating said nut whereby to effect a variation in the speed of movement of said slide independently of the speed at which the same is fed or traversed through said change-speed gearing.

32. In a milling machine comprising a bed and a work supporting table mounted thereon, a spindle housing mounted for movement on said bed relative to the table and supporting a cutter spindle, change speed gearing contained solely within the housing immediately adjacent the spindle for driving the same at different speeds, other gearing for feed and rapid traverse movements of said spindle also contained solely within said housing, and power means for driving said gearing.

33. A milling machine as set forth in claim 32 including means for feeding and traversing the housing on the bed, the said means comprising a nut carried by the housing, a feed screw mounted in the bed, and an extension between the bed and the feed and traverse gearing in the housing to operate the feed screw, the extension having a reversing drive connection with the feed and traverse gearing for movement of the housing in either direction.

34. In a milling machine comprising a bed having a work supporting table mounted thereon, a spindle housing having a cutter spindle mounted therein for operation over the table, change speed gearing for driving the spindle at different speeds and feed and traverse gearing for communicating axial movement to the spindle, both the change speed gearing and the feed and traverse gearing being contained wholly within the spindle housing to move therewith relative to the bed.

35. A milling machine of the character described comprising a bed, a spindle slide movable forwardly and backwardly on the bed toward and away from the work, a work table, a saddle for supporting the same, one of the latter two elements being arranged to have rotary movement about a vertical axis and the other being arranged to have horizontal movement transversely with relation to the movement of said slide, a vertical cutter spindle on the slide disposed over the work table, and a cutter arbor support fixed to the slide between the table and spindle and arranged to move with the slide and its spindle relative to the table.

36. A milling machine comprising a bed, a spindle slide housing mounted on horizontal ways on the bed to move forwardly and backwardly with reference to the work, a table saddle, a work table mounted thereon, one of the latter two elements being arranged to have rotary movement about a vertical axis and the other to have horizontal movement laterally with respect to the movement of the spindle slide, the work table moving on ways substantially coplanar with the horizontal spindle housing ways, a cutter spindle on said slide, and mechanism on the spindle slide for driving the spindle having an extension between the slide and the bed and between the bed and the saddle to transmit feed to the latter.

37. A milling machine comprising a bed, a spindle slide housing mounted on horizontal ways on the bed to move forwardly and backwardly with reference to the work, a table saddle, a work table mounted thereon, one of the latter two elements being arranged to have rotary movement about a vertical axis and the other to have horizontal movement laterally with respect to the movement of the spindle slide, the work table moving on ways substantially coplanar with the horizontal spindle housing ways, a cutter spindle on said slide, and mechanism carried by the spindle slide for transmitting lateral feed to one of the two elements referred to and rotary feed to the other.

38. A milling machine comprising a bed, a spindle slide housing mounted on horizontal ways on the bed to move forwardly and backwardly with reference to the work, a table saddle, a work table mounted thereon, one of the latter two elements being arranged to have rotary movement about a vertical axis and the other to have horizontal movement laterally with respect to the movement of the spindle slide, the work table moving on ways substantially coplanar with the horizontal spindle housing ways, a cutter spindle on said slide, and mechanism carried by the spindle slide for transmitting rapid traverse and feed movements to the saddle and work table.

39. A milling machine comprising a bed, a spindle slide housing mounted on horizontal ways on the bed to move forwardly and backwardly with reference to the work, a table saddle, a work table mounted thereon, one of the latter two elements being arranged to have rotary movement about a vertical axis and the other to have horizontal movement laterally with respect to the movement of the spindle slide, the work table moving on ways substantially coplanar with the horizontal spindle housing ways, a cutter spindle on said slide, and mechanism carried by the spindle slide and transmitting through a single shaft rapid traverse and feed movements to the spindle slide, table saddle and work table.

40. A milling machine comprising a bed, a spindle slide housing mounted on horizontal ways on the bed to move forwardly and backwardly with respect to the work, a cutter spindle on said slide, a table saddle mounted on the bed, a work table mounted on the saddle, one of the two last mentioned elements being arranged to move laterally with respect to the spindle slide and the other being arranged to turn about a vertical axis, the table moving on ways substantially coplanar with the horizontal spindle housing ways, a motor on the bed, feed mechanism carried by the spindle slide, means for driving said mechanism from said motor, and means for transmitting feed from said mechanism to the spindle slide, table saddle and work table.

41. In a milling machine of the character described, the combination of a horizontal feed spindle slide, a cutter spindle on said slide, a table saddle, a work table on said saddle, one of the two last mentioned elements being arranged to have lateral feed and the other rotary feed, a vertical driving shaft, change-speed gearing interposed between said shaft and the spindle for driving the latter at different speeds, rapid traverse and change-speed gearing driven by said shaft, and driving trains between the latter gearing and the cutter spindle, the spindle slide, the work table, and the table saddle, whereby to transmit rapid traverse and variable feed movement to said parts.

42. In a milling machine of the character described, the combination of a table saddle, a work table thereon, one of the two last mentioned elements being arranged to have lateral feed and the other rotary feed, a longitudinal feed spindle slide, a cutter spindle on said slide above said table, a common variable speed power-operated feed mechanism for imparting feeds to the cutter spindle, spindle slide, work table and table saddle, means for independently connecting said parts to said mechanism, and manually operable means for imparting feed movement to each of said parts either independently of or simultaneously with said power-operated mechanism.

43. In a milling machine of the character described, the combination of a work table, a table saddle, one of the two last mentioned elements being arranged to have rotary movement and the other lateral movement, a longitudinal feed spindle slide carrying a cutter spindle, a driving shaft below the spindle slide, a vertical shaft carried by the spindle slide and constantly in mesh with the driving shaft, change-speed gearing between said vertical shaft and the cutter spindle for driving the latter, a screw for feeding the spindle slide longitudinally, a screw for feeding one of the two elements above referred to laterally, a worm gear for revolving the other of the two elements above referred to, change-speed gearing carried by the spindle slide and driven by said vertical shaft, and means operated by the last mentioned change-speed gearing for driving said spindle slide screw, table saddle screw and table feed worm.

44. A milling machine comprising a bed, a spindle slide mounted on horizontal ways on the bed to move forwardly and backwardly, a cutter spindle operating on a vertical axis on said slide, a work table in front of said slide arranged to move on ways substantially coplanar with the horizontal spindle slide ways, and feed and traverse mechanism for the spindle and the table.

45. A milling machine comprising a bed, a spindle slide mounted on horizontal ways on the bed to move forwardly and backwardly, a cutter spindle on said slide, a saddle in front of said slide arranged to reciprocate on ways substantially parallel with the horizontal spindle slide ways, a rotary work table on the top of the saddle and feed and traverse mechanism for the spindle and the saddle and table.

46. A milling machine comprising a bed, a spindle slide mounted on horizontal ways on the bed to move back and forth in one line of direction, a cutter spindle operating on a vertical axis on said slide, a table saddle mounted on the bed, a work table mounted on said saddle, one of the two last mentioned elements being arranged to move back and forth at right angles to the movement of the slide and in a plane parallel with its movement and the other being arranged to revolve about a vertical axis on ways in a plane parallel with the movement of the slide, and mechanism carried by the slide for driving the spindle and for moving the same axially, the said mechanism also having an extension to the table saddle and work table for transmitting movement to said parts.

47. A milling machine comprising a bed, a spindle slide mounted on horizontal ways on the bed to move back and forth in one line of direction, a cutter spindle operating on a vertical axis on said slide, a table saddle mounted on the bed, a work table mounted on said saddle, one of the two last mentioned elements being arranged to move back and forth at right angles to the movement of the slide and in a plane parallel with its movement and the other being arranged to revolve about a vertical axis on ways in a plane parallel with the movement of the slide, and mechanism carried by the slide for driving the spindle and for moving the same axially, the said mechanism also having an extension to the table saddle and work table for transmitting movement to said parts, the operating connections with the mechanism being in each case separately engageable and permitting of operation in either direction.

48. In a machine tool comprising a bed and a slide movable on ways on said bed, a screw mounted on one of the two last mentioned parts for communicating movement to said slide, variable speed gearing for operating said feed screw, a rotatable nut mounted on the other of the two parts referred to and having the feed screw threading therein, and manually operable means for rotating said nut during and independently of operation of said feed screw to speed up or slow down movement of the slide as desired.

49. In a machine tool comprising a bed member and a slide member movably mounted on ways on said bed member, a screw element mounted on one of the two members referred to, a nut element threaded thereon and mounted on the other member, variable speed gearing having connection with one of said elements for turning the same whereby to communicate movement to the slide member, and manually operable means for turning the other element during and independently of operation of the first element to speed up or slow down movement of the slide as desired.

50. A milling machine comprising a bed, a spindle slide housing mounted on horizontal ways on the bed to move forwardly and backwardly, a cutter spindle on said slide, a saddle mounted on the bed to move laterally with respect to the spindle slide, a rotary work table mounted on the saddle to revolve about a vertical axis on ways substantially parallel with the aforesaid horizontal spindle slide housing ways, and mechanism carried by said slide housing for driving the spindle, for transmitting traverse and feed to the slide with respect to the bed, and for transmitting lateral feed to the saddle and rotary feed to the table.

51. In a milling machine comprising a bed and a work support, a spindle slide housing mounted for movement on said bed with reference to the work support and carrying a cutter spindle, a feed screw mounted in the bed for communicating movement to said spindle slide housing, a nut carried by the housing and threading on said screw, feed and traverse gearing contained solely within the housing, and an operating connection for the feed screw in the bed with the gearing in the housing to operate the feed screw, said connection being constructed to permit movement of the housing relative to the bed.

52. In a milling machine, the combination of a bed, a work support, a spindle slide housing mounted on the bed for movement with reference to the work support and carrying a cutter spindle in a portion of said housing overreaching the work support, change speed gearing for the driving of said spindle mounted in the overreaching portion of said housing next to the spindle, feed and traverse gearing in the main body portion of said housing, a vertically disposed shaft between the two sets of gearing having a driving connection at the upper end with the change speed gearing and at another point with the feed and traverse gearing, means for driving said shaft, and a feed screw in the bed for communicating movement to the slide relative to the bed and having a driving connection with the feed and traverse gearing in the slide.

53. In a milling machine, the combination of a bed, a work support, a spindle slide housing mounted on the bed for movement with reference to the work support and carrying a cutter spindle in a portion of said housing overreaching the work support, change speed gearing for the driving of said spindle mounted in the overreaching portion of said housing next to the spindle, feed and traverse gearing in the main body portion of said housing, a vertically disposed shaft between the two sets of gearing having a driving connection at the upper end with the change speed gearing and at another point with the feed and traverse gearing, a power driven shaft horizontally disposed in said bed and having a sliding gearing connection with the last mentioned shaft for transmitting drive thereto, a feed screw in said bed cooperating with a feed nut on said slide for communicating movement to the slide, and means providing a sliding gearing connection between the feed and traverse gearing in said slide and said feed screw.

54. In a milling machine of the character described, the combination of a bed, a lateral feed work support on the bed, a spindle slide on the bed movable horizontally toward and away from the work support and carrying a cutter spindle for operation over the work support, power operated mechanism for imparting feed movements to the work support and spindle slide, and a single manually operable member for imparting feed movements to said work support and spindle slide.

55. In a milling machine of the character described, the combination of a lateral feed work support, a longitudinal feed spindle slide, a cutter spindle on said slide for operation over the work support, a common variable speed power operated feed mechanism for imparting feeds to the cutter spindles, spindle slide and work support, mean for independently connecting said parts to said mechanism, and a single manually operable member for imparting feed movements to said parts.

56. In a milling machine, the combination of a bed, a spindle-carrying slide mounted on the bed for longitudinal feed, a saddle mounted on the bed for lateral feed, a rotary work table on the saddle arranged to revolve about a vertical axis in a plane substantially parallel with the movement of the spindle slide, a common variable speed power-operated feed mechanism for imparting feeds to the spindle slide, table saddle and rotary table, means for independently connecting the spindle slide to said mechanism to transmit longitudinal movement thereto in either direction, and means for connecting the saddle to said mechanism either independently of the rotary work table or both together, whereby to communicate lateral movement to the saddle alone in either direction or lateral movement to the saddle accompanied with rotary movement of the table in either direction.

57. In a milling machine, the combination of a bed, a longitudinal feed spindle slide on said bed, a lateral feed saddle on said bed with relation to which the slide is movable back and forth, a rotary work table mounted on the top of the saddle to revolve about a vertical axis in a plane substantially parallel with the plane of movement of the slide, mechanism for imparting reciprocatory movement to the slide and saddle and rotary movement to the table, and control means for the slide, saddle, and table, whereby one or more of the three parts are arranged to be operated at a time by said mechanism.

58. In a milling machine, the combination of a power-operated work support mounted for longitudinal and circular movement in a substantially horizontal plane, and a power-driven milling cutter disposed vertically above the work support and mounted for horizontal movement crosswise of the work support.

59. In a milling machine, the combination of a power-operated saddle mounted for longitudinal movement in a horizontal plane, a work table on said saddle arranged to be given rotary movement under power and to be carried to different operative positions by reason of longitudinal movement of the saddle, and a power-driven milling cutter disposed vertically above the table and mounted for horizontal movement crosswise with reference to the movement of the saddle.

60. In a machine tool of the character described, the combination of a bed and a work support, a spindle slide housing mounted for movement on the bed with reference to the work support, a tool spindle mounted in said housing in a portion thereof overhanging the work support, change speed gears in the overhanging portion of said housing next to the spindle for driving the latter at variable speeds, a driven shaft for transmitting drive to said gearing extending downwardly, therefrom, power means on said bed, and means providing a sliding gearing connection between the power means and the lower end of said shaft.

JOHN R. JOHNSON.